United States Patent
Kumar

(10) Patent No.: US 8,443,365 B2
(45) Date of Patent: May 14, 2013

(54) METHODS AND SYSTEMS TO CLONE A VIRTUAL MACHINE INSTANCE

(75) Inventor: Agarwal Sumit Kumar, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 12/938,987

(22) Filed: Nov. 3, 2010

(65) Prior Publication Data

US 2012/0110574 A1 May 3, 2012

(51) Int. Cl.
G06F 9/455 (2006.01)
G06F 9/46 (2006.01)
G06F 11/00 (2006.01)

(52) U.S. Cl.
USPC .................................. 718/1; 714/100; 714/1

(58) Field of Classification Search ........................ None
See application file for complete search history.

(56) References Cited

U.S. PATENT DOCUMENTS

| | | | |
|---|---|---|---|
| 7,536,525 | B2 | 5/2009 | Chandrasekaran et al. |
| 2007/0258388 | A1 | 11/2007 | Bose |
| 2008/0163210 | A1 | 7/2008 | Bowman et al. |
| 2009/0228883 | A1 | 9/2009 | Gebhart et al. |
| 2009/0260007 | A1 | 10/2009 | Beaty et al. |
| 2010/0042636 | A1 | 2/2010 | Lu |
| 2010/0122248 | A1 | 5/2010 | Robinson et al. |

OTHER PUBLICATIONS

"vSphere 4.1—ESX and vCenter" sections Clone a Virtual Machine and Configure a Script to Generate Computer Names and IP Addresses During Guest Operating System Customization, Jul. 2010, VMware.*

Lagar-Cavilla, H. A., et al., SnowFlock: Rapid Virtual Machine Cloning for Cloud Computing, University of Toronto and Carnegie Mellon University, Apr. 1-3, 2009, pp. 1-12.

Sun, Y., et al., Fast Live Cloning of Virtual Machine Based on Xen, 11th IEEE International Conference on High Performance Computing and Communications, Jun. 25-27, 2009, pp. 392-399.

* cited by examiner

*Primary Examiner* — Qing Wu

(57) ABSTRACT

In one embodiment, an initialization script including instructions to define a value of a parameter at a cloned virtual machine instance is generated and stored at a virtual disk of a source virtual machine instance. The value of the parameter at the cloned virtual machine instance is different from the value of the parameter at the source virtual machine instance. An image of the virtual disk is then sent to a virtual machine module. The cloned virtual machine instance is instantiated at the virtual machine module based on the image of the virtual disk.

20 Claims, 11 Drawing Sheets

METHODS AND SYSTEMS TO CLONE A VIRTUAL MACHINE INSTANCE

BACKGROUND

Cloning virtual machine instances can be problematic because cloning yields two identical entities (i.e., virtual machine instances) within a computing system such as a group of computing devices interconnected via a communications link such as a communications network and hosting virtual machine modules. Furthermore, cloning virtual machine instances can be complicated because it can be useful for a cloned virtual machine instance to have an identity value (e.g., a name, an identifier, a password, a security credential such as a digital certificate, a locale, a time zone, and/or some other value associated with an identity of a virtual machine instance) distinct from an identity value of a source virtual machine instance.

Some systems (i.e., computing devices and/or groups of computing devices) distinguish cloned virtual machine instances from source virtual machine instances using parameters stored at a hypervisor. For example, a cloned virtual machine instance can communicate with a hypervisor to access runtime parameters to be applied to the cloned virtual machine instance to differentiate the cloned virtual machine instance from a source virtual machine instance. Thus, the cloned virtual machine instance must be able to communicate with the hypervisor.

Communication with hypervisors can be difficult because hypervisor vendors implement (or support) different communications protocols. Thus, if a virtual machine instance will be hosted at virtual machine modules in communication with hypervisors from different hypervisor vendors, that virtual machine instance will include multiple software applications to communicate with each of the different hypervisors.

Including these software applications in a cloned virtual machine image (and, thus, in the image of the virtual disk of that cloned virtual machine image) complicates the cloning process because it results in an increased size of the virtual disk image and additional maintenance overhead to support (i.e., update) these software applications. Additionally, system administrators or system integrators are limited to the parameters provided by the vendor of these software applications and/or hypervisor. Moreover, because these software applications are typically specific to a hypervisor (or type of hypervisor), system administrators or system integrators typically must implement the software applications or other processes for each type of hypervisor that will be hosting virtual machine. Furthermore, generating multiple versions of a virtual machine instance (e.g., a different version for each hypervisor at which that virtual machine instance will be hosted) complicates maintenance of that virtual machine instance because each version of the virtual machine instance should be changed in response to changes to one of the versions of the virtual machine instance to ensure consistency across the various versions of the virtual machine instance. As a result, administration of virtual machine instances can be complex and cost-intensive.

DETAILED DESCRIPTION

Figure 1:
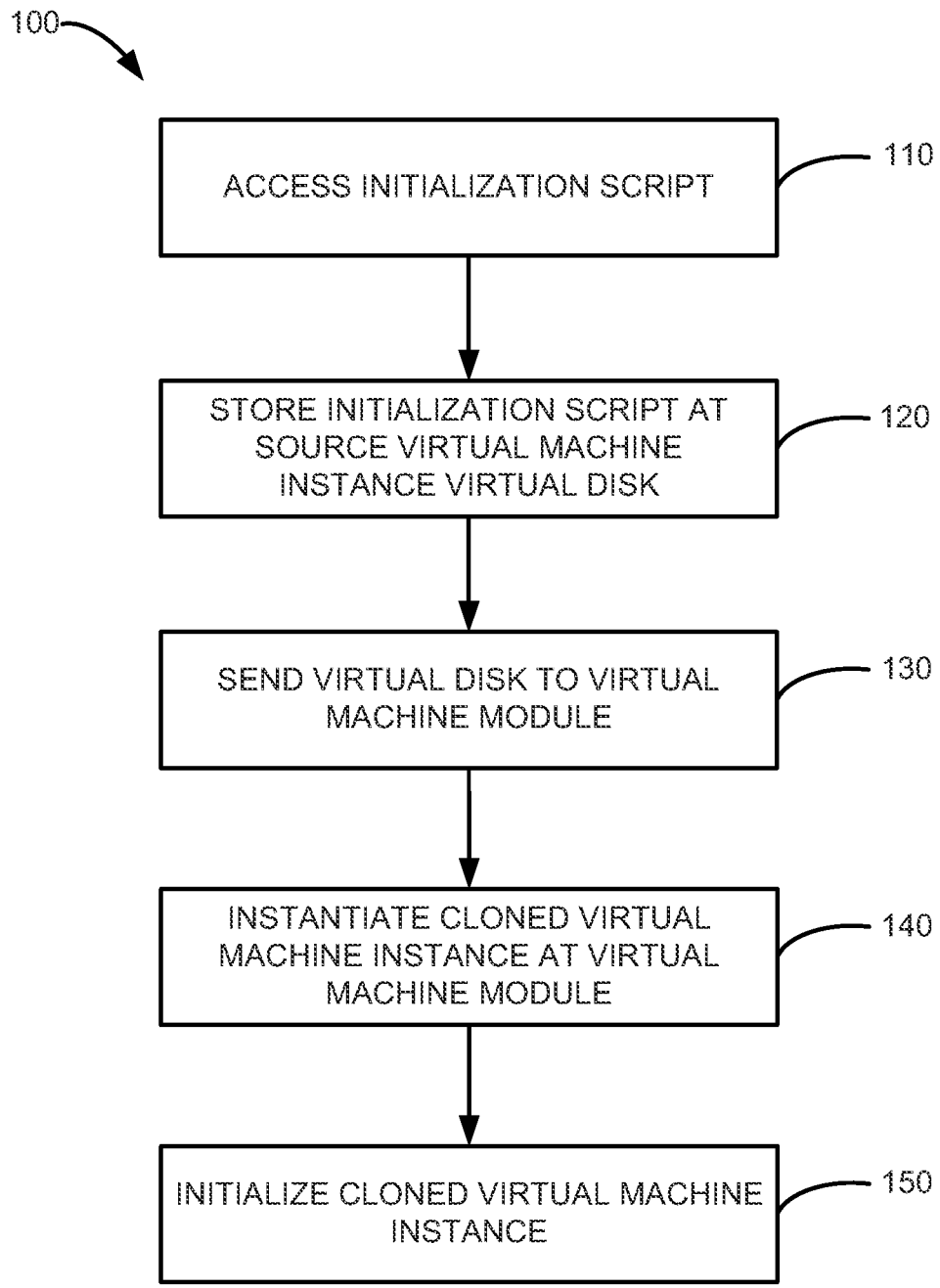
FIG. 1 is a flowchart of a process to clone a virtual machine instance, according to an embodiment.

A virtual machine module is an environment that interprets or executes instructions or code. For example, a virtual machine module can be a software implementation of a processor or machine that executes code (or instructions) that are executable at that processor or machine. In other words, a virtual machine module is a software module stored at a memory and executed at a processor (i.e., a virtual machine module is a software module hosted at that processor) that functions as a processor or machine. As a specific example, a virtual machine module can be a software module stored at a memory and executed at a processor that emulates a personal computer.

A hypervisor is a hardware module, software module stored at a memory and executed at a processor, and/or a combination of a hardware module and/or a software module that controls, monitors, and/or provisions one or more virtual machine modules. For example, a hypervisor can instantiate, initialize, pause, shut down, and/or restart virtual machine modules. Additionally, a hypervisor can communicate with virtual machine modules. As a specific example, a hypervisor can communicate with virtual machine modules using a virtualized network interface defined by the hypervisor. Furthermore, a hypervisor can provision or provide access to (e.g., multiplex) components of a computing device (or machine) such as communications interfaces (e.g., a Universal Serial Bus ("USB") interface, an RS232 interface, or a network interface), data stores such as hard disk drives or compact disc ("CD") drives, and/or other components of a computing device to virtual machine modules. In other words, a hypervisor can be an intermediary between a virtual machine module and a computing device and/or other virtual machine modules. As a specific example, a hypervisor can define virtualized components of the physical components of a computing device. The virtual machine modules (and virtual machine instances at those virtual machine modules) associated with that hypervisor can access the virtualized components and the hypervisor can operate as a multiplexer and demultiplexer between the virtualized components and the physical components those virtualized components represent.

A virtual machine module executes or hosts a virtual machine instance. A virtual machine instance is the code, instructions, and/or data that are executed or accessed within a virtual machine module. In other words, a virtual machine instance is an instantiation of executable code and/or data within a virtual machine module. For example, a virtual machine instance can include a virtual disk (i.e., a file or group of files) with an operating system and data such as data files and state information related to a virtual machine module (or virtual machine module state). The virtual machine module accesses the virtual disk and executes the operating system (i.e., instructions or code that implements the operating system). Additionally, data stored at the virtual disk is accessible (e.g., can be read and/or modified) within the virtual machine. The virtual machine instance can also include applications (e.g., software applications or programs) that are executable, for example, within the operating system of the virtual machine instance. Furthermore, the virtual machine module state can include information related to a present state (or execution context or context) of the virtual machine module. For example, the virtual machine module state can include values of an instruction pointer or counter (i.e., a reference an instruction that is to be interpreted), registers (e.g., a stack pointer register, an accumulator register, and/or a data register) of the virtual machine module, and/or other state information related to the virtual machine module.

A virtual machine instance, therefore, is executed within a virtual machine module and can be referred to as being independent from a physical processor or machine. In other words, a virtual machine instance is interpreted by a virtual machine module rather than at a processor. Although the virtual machine module is hosted at a processor, the virtual machine instance can be interpreted by the virtual machine module. For example, a first virtual machine module can be hosted at a processor of a first processor class (i.e., a type, architecture, or model of processor) and a second virtual machine module can be hosted at a processor of a second processor class that is incompatible with the first processor class. Said differently, the processor of the first processor class can interpret instructions (or code) that the processor of the second processor class cannot interpret.

The first virtual machine module and the second virtual machine module, however, can implement a common virtual machine architecture, and a virtual machine instance can be hosted at either the first virtual machine module or the second virtual machine module. That is, because the first virtual machine module and the second virtual machine module implement a common virtual machine architecture (i.e., the first virtual machine module and the second virtual machine module interpret the same set of instructions in functionally equivalent ways), the virtual machine instance can be hosted (or executed) at the first virtual machine module or the second virtual machine module. Thus, the virtual machine instance can be hosted at the first virtual machine module or the second virtual machine module independent of the processor class of the processors at which the first virtual machine module and the second virtual machine module are hosted.

Virtual machine instances can typically be migrated from one virtual machine module to another virtual machine module. In other words, a virtual machine instance can be removed from one virtual machine module and moved to another virtual machine module. Similarly, virtual machine instances can be cloned. Said differently, a virtual machine instance can be copied from a first virtual machine module to a second virtual machine module, and the virtual machine instance can continue to execute at the first virtual machine module and the copy of the virtual machine instance can execute at the second virtual machine module. Migration of virtual machine instances can be useful, for example, during maintenance and/or failure of a processor or machine hosting virtual machine modules. Cloning of virtual machine instances can be useful, for example, to aid in load balancing and/or handling increased processing or storage demands of a service implemented by virtual machine instances (e.g., a service implemented by an application of a virtual machine instance).

Cloning virtual machine instances, however, can be problematic because cloning can yield two identical entities (i.e., virtual machine instances) within a computing system such as a group of computing devices interconnected via a communications link such as a communications network and hosting virtual machine modules. For example, each entity within a communications network typically has a unique (within that communications network) network address such as a Media Access Control ("MAC") address, an Internet Protocol version 4 ("IPv4") address, and/or Internet Protocol version 6 ("IPv6") address. An exact copy (or clone) of a virtual machine instance within a communications network would yield two entities—the original or source virtual machine instance and the copy or cloned virtual machine instance—with a common network address. Typical communications networks can fail to reliably provide communications between entities within those communications networks if multiple entities share a common network address.

Furthermore, cloning virtual machine instances can be complicated because it can be useful for a cloned virtual machine instance to have an identity value or identifier (e.g., a name, an identifier, a password, a security credential such as a digital certificate, a locale, a time zone, and/or some other value associated with an identity of a virtual machine instance) distinct from an identity value of a source virtual machine instance. For example, a data storage service can require a username and a password to store data at that data storage service and allow only a single login for a username and password combination at a time. Accordingly, a source virtual machine instance and a cloned virtual machine instance cannot each be logged in to the data storage service if a single username and password combination is shared between the source virtual machine instance and the cloned virtual machine instance. Thus, it can be desirable to alter a cloned virtual machine instance such that the cloned virtual machine instance is distinct (or can be distinguished from) a source virtual machine instance of that cloned virtual machine instance. For example, it can be desirable to provide alternate runtime parameters (e.g., a network address and/or other identity values) to a cloned virtual machine instance that are different from the runtime parameters of the source virtual machine instance to distinguish the cloned virtual machine instance from the source virtual machine instance.

Some systems (i.e., computing devices and/or groups of computing devices) distinguish cloned virtual machine instances from source virtual machine instances using parameters stored at a hypervisor. For example, before cloning a virtual machine instance, a hypervisor can store runtime parameters (or values of runtime parameters) at a data store of that hypervisor to be associated with a cloned virtual machine instance when that cloned virtual machine instance is instantiated at a virtual machine module. The virtual machine instance can then be copied (e.g., an image of the virtual disk of that virtual machine instance is generated and sent) to the virtual machine module and instantiated. A software application within the cloned virtual machine instance can then communicate with the hypervisor to retrieve the stored runtime parameters and apply those runtime parameters to differentiate the cloned virtual machine instance from the source virtual machine instance. Said differently, the cloned virtual machine instance communicates with the hypervisor to access runtime parameters at the hypervisor to be applied to the cloned virtual machine instance.

Because the cloned virtual machine instance accesses (or retrieves) its runtime parameters at the hypervisor, the cloned virtual machine instance must be able to communicate with the hypervisor. Typically, hypervisors from different hypervisor vendors implement (or support) different communications protocols. Thus, if a virtual machine instance will be hosted at virtual machine modules in communication with hypervisors from different hypervisor vendors, that virtual machine instance will include multiple software applications to communicate with each of the different hypervisors. Including these software applications in a cloned virtual machine image (and, thus, in the image of the virtual disk of that cloned virtual machine image) complicates the cloning process because it results in an increased size of the virtual disk image and additional maintenance overhead to support (i.e., update) these software applications. Furthermore, generating multiple versions of a virtual machine instance (e.g., a different version for each hypervisor at which that virtual machine instance will be hosted) complicates maintenance of that virtual machine instance because each version of the virtual machine instance should be changed in response to changes to one of the versions of the virtual machine instance to ensure consistency across the various versions of the virtual machine instance.

Embodiments discussed herein can clone virtual machine instances without accessing runtime parameters of the cloned virtual machine instances at a hypervisor. In other words, embodiments discussed herein can clone virtual machine instances independent of a communications protocol of the hypervisors in communication with the virtual machine modules at which the cloned virtual machine instances will be hosted. Thus, virtual machine instances can be cloned to (or hosted at) various classes (or types) of hypervisors such as hypervisors from different hypervisor vendors.

As a specific example, an initialization script is stored at a virtual disk of a source virtual machine instance in response to a clone request for the source virtual machine instance. The initialization script includes instructions to define runtime parameters of a cloned virtual machine based on a virtual machine instance identifier. An image of the virtual disk is generated and sent to a virtual machine module to clone the source virtual machine instance.

The initialization script is included within the image of the virtual disk because the image is a copy of the virtual disk of the source virtual machine instance. The cloned virtual machine instance is then instantiated at the virtual machine module (e.g., an operating system included within the virtual disk image is booted within the virtual machine module). Furthermore, the virtual machine module can define or receive a virtual machine instance identifier and provide the virtual machine instance identifier to the cloned virtual machine instance during instantiation of the cloned virtual machine instance. For example, the virtual machine instance identifier can be a MAC address of a virtualized network interface accessible to the virtual machine module (and, therefore, the cloned virtual machine instance).

The initialization script is executed with the virtual machine instance identifier as an argument during instantiation of the cloned virtual machine instance, and the runtime parameters of the cloned virtual machine instance are generated or defined based on instructions of the initialization script and the virtual machine instance identifier. That is, the virtual machine instance identifier is an operand of the operations defined by the instructions of the initialization script, and the results of those operations are the runtime parameters (or values of runtime parameters) of the cloned virtual machine instance. Alternatively, for example, the initialization script can be executed at a time other than at initialization of the cloned virtual machine instance. For example, an initialization (or other) script can be scheduled to be executed or processed in response to an event such as expiry of a timer, at a predetermined time, or in response to data or a signal received at a communications interface associated with the cloned virtual machine instance such as a network interface. As a specific example, an initialization script can be scheduled to executed at the expiry of a timer (e.g., using the cron utility in a Linux™-based environment or system) set to expire two hours after the cloned virtual machine instance is instantiated (or initialized).

The runtime parameters can then be applied to the cloned virtual machine instance to differentiate the cloned virtual machine instance from the source virtual machine instance. Thus, the runtime parameters of the cloned virtual machine instance can be defined without accessing those runtime parameters or other values at a hypervisor. Accordingly, cloned virtual machine instances at virtual machine module associated with various hypervisors can be differentiated from a source virtual machine instance without including software applications to communicate with each of the various hypervisors. Said differently, the cloned virtual machine instances are agnostic to the class of hypervisors (or the communications protocol of the hypervisors) associated with the virtual machine modules at which the cloned virtual machine instances are hosted.

As used herein, the singular forms "a," "an," and "the" include plural referents unless the context clearly dictates otherwise. Thus, for example, the term "virtual machine instance" is intended to mean one or more virtual machine instances or a combination of virtual machine instances. Additionally, as used herein, the term "module" refers to circuitry and/or software, firmware, programming, machine- or processor-readable instructions, commands, or code that are stored at a memory and executed or interpreted at a processor.

FIG. 1 is a flowchart of a process to clone a virtual machine instance, according to an embodiment. Process 100 can be implemented as a hardware module, as a software module, and/or as a combination of a hardware module and a software module. For example, process 100 can be implemented as application-specific circuitry or as a software module including instructions stored at a memory and executed at a processor in communication with the memory. More specifically, for example, process 100 can be implemented at a hypervisor.

An initialization script including instructions (or codes or commands) that when executed define (or generate) runtime parameters for a cloned virtual machine is accessed at block 110. For example, an initialization script can be generated in response to input (e.g., a number of cloned virtual machine instances or an identifier of one or more runtime parameters to be generated) from a user and then accessed. In some embodiments, an initialization script can be accessed from a library or collection of initialization scripts. In some embodiments, an initialization script can be accessed at (e.g., selected from) a library of initialization scripts and modified based on input from a user.

Typically, an initialization script is configured to receive arguments such as environment variables and/or command line options. These arguments are operands to the operations defined by the instructions of the initialization script to define one or more runtime parameters. For example, an initialization script can receive or access an environment variable including the value of a MAC address, universally unique identifier ("UUID"), or other virtual machine instance identifier and can define runtime parameters based at least in part on that virtual machine instance identifier. As a more specific example, a hash value can be defined from a MAC address and that hash value can be an index to a table of runtime parameters within the initialization script. Thus, a runtime parameter can be selected from the table using the hash value. As another example, a byte (i.e., eight bits) of a UUID can be used as the last octet of an IPv4 address runtime parameter.

The initialization script is then stored at the virtual disk of the source virtual machine instance at block 120. That is, the initialization script is stored within the virtual machine instance that will be cloned. The initialization script can be, for example, an rc script for a Linux®-based operating system and can be stored in a file system directory of the virtual disk related to rc scripts such as an /etc/rc.d/ directory. Alternatively, for example, the initialization script can be a startup task in a Microsoft Windows® operating system and can be stored in a task directory. In some embodiments, a reference to the initialization script can be stored within a registry or a list of startup or initialization items of an operating system at the virtual disk.

An image (or copy) of the virtual disk is then sent to a virtual machine module that will host the cloned virtual machine instance at block 130. In other words, a copy of the virtual disk of the source virtual machine module is generated and sent to the destination virtual machine module. In some embodiments, a virtual machine module state is also sent to a destination virtual machine module (i.e., the virtual machine module that will host the cloned virtual machine instance). Thus, the destination virtual machine module can have the same state as the source virtual machine module (i.e., the virtual machine module that will host the source virtual machine instance). In other words, the context of the cloned virtual machine instance can be initialized using a virtual machine module state of the source virtual machine instance to have the same context within the destination virtual machine module as the source virtual machine instance has within the source virtual machine module.

The cloned virtual machine instance is then instantiated at the destination virtual machine module at block 140. For example, an operating system within the virtual disk image can be booted to instantiate the cloned virtual machine instance. In some embodiments, a virtual machine module state of the source virtual machine module can be applied to the destination virtual machine module to instantiate the cloned virtual machine instance. For example, register values, an instruction pointer or counter, and/or memory contents of the source virtual machine module can be applied to the destination virtual machine module such that the destination virtual machine module (and, therefore, the cloned virtual machine instance) has the same execution context as the execution context of the source virtual machine module (and, therefore, the source virtual machine instance).

One or more virtual machine instance identifiers are typically received at the cloned virtual machine instance during instantiation of the cloned virtual machine instance. For example, a MAC address of a virtualized network interface is typically accessed by an operating system of a cloned virtual machine instance in a manner similar to an operating system hosted at a computing device with a physical network interface. That is, the operating system of the cloned virtual machine instance can discover (or detect) a virtualized network interface such as a virtualized network interface defined by a hypervisor and access a MAC address of that virtualized network interface using the same methodology used by an operating system to discover a physical network interface and access a MAC address of that physical network interface. Similarly, for example, a cloned virtual machine can access or receive a UUID or other virtual machine instance identifier in the same way an operating system hosted at a computing device accesses a machine or system identifier from, for example, a trusted platform module ("TPM"). Alternatively, a cloned virtual machine can access or receive identifiers of virtualized and/or physical components (e.g., hard disk drives, network interfaces, graphics interfaces, and/or other components) and can define a virtual machine instance identifier in the same way an operating system hosted at a computing device accesses identifiers of physical components of that computing device. In other words, a virtual machine instance identifier is a value that uniquely identifies a virtual machine module and can be derived from, for example, identifiers of components (or virtual components) of a computing device and/or a hypervisor.

The initialization script is then executed at the cloned virtual machine instance at block 150 to initialize the cloned virtual machine instance to be different from the source virtual machine instance. In other words, the instructions of the initialization script are executed (or interpreted) within the cloned virtual machine instance to define runtime parameters of the cloned virtual machine instance and to apply those runtime parameters to the cloned virtual machine instance. As discussed above, a virtual machine instance identifier can be provided (or accessible) to the initialization script and the runtime parameters generated can be based at least in part on the virtual machine instance identifier. Moreover, the initialization script can be executed during initialization of the cloned virtual machine instance and/or at a time other than at initialization of the cloned virtual machine instance. For example, an initialization (or other) script can be scheduled to be executed or processed in response to an event such as expiry of a timer, at a predetermined time, or in response to data or a signal received at a communications interface associated with the cloned virtual machine instance such as a network interface.

As a specific example, MAC address of a virtualized network interface can be a virtual machine instance identifier and can be provided to an initialization script as an environment variable of an execution environment of the initialization script. Alternatively, for example, the initialization script can invoke an application programming interface ("API") of the execution environment (e.g., an operating system of the cloned virtual machine instance) to access the MAC address. An IPv4 address different from an IPv4 address of the source virtual machine instance can be defined by the initialization script based on the MAC address, and that IPv4 address can be assigned to the cloned virtual machine instance (or the virtualized network interface of the cloned virtual machine instance).

Process 100 can include blocks in addition to those illustrated in FIG. 1. Additionally, one or more blocks can be rearranged. Furthermore, although process 100 is discussed above with reference to an example environment including a hypervisor, process 100 is applicable within other environments.

FIGS. 2A, 2B, 2C, and 2D are an illustration of a cloning a virtual machine instance at a computing device. As illustrated in FIGS. 2A, 2B, 2C, and 2D, computing device 200, virtual machine module 210, virtual machine module 220, hypervisor 230, and initialization script module 240 are shown logically. In other words, FIGS. 2A, 2B, 2C, and 2D illustrate the relationships between computing device 200, virtual machine module 210, virtual machine module 220, hypervisor 230, and initialization script module 240 rather than the physical embodiment or arrangement of computing device 200, virtual machine module 210, virtual machine module 220, hypervisor 230, and initialization script module 240. For example, computing device 200 is a computing device such as a computer server that includes a processor (not shown) and a memory (not shown). Virtual machine module 210, virtual machine module 220, hypervisor 230, and initialization script module 240 can be applications (or application modules) stored at a memory (not shown) and executed at a processor (not shown) of computing device 200. As an example of a computing device, FIG. 3 is a schematic block diagram of a computing device, according to an embodiment.

Figure 3:
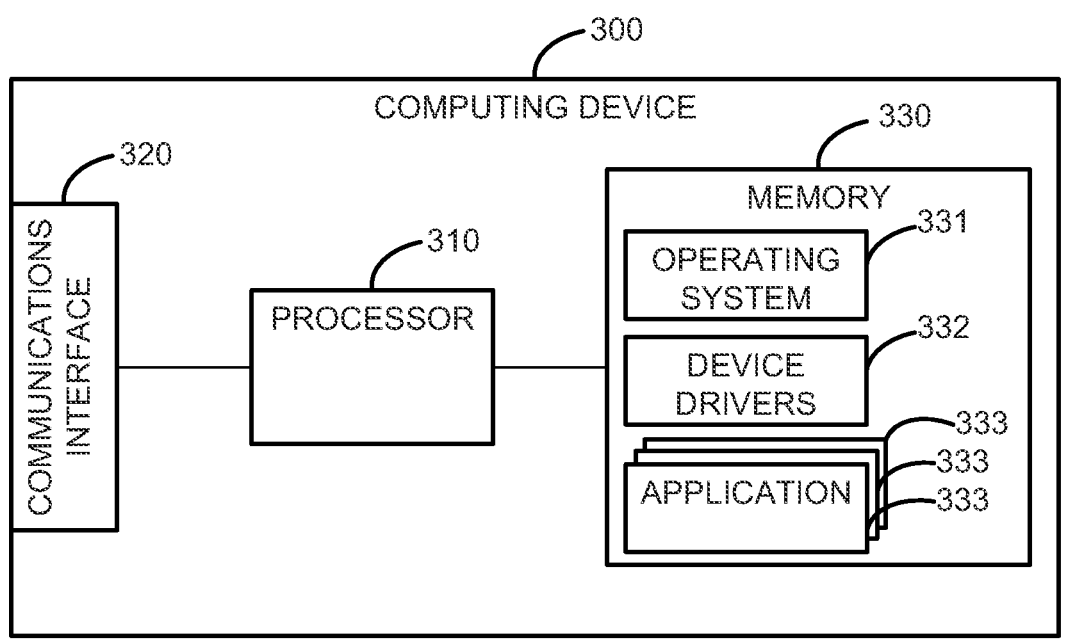
FIG. 3 is a schematic block diagram of a computing device, according to an embodiment.

As illustrated in FIG. 3, computing device 300 includes communications interface 320, processor 310, and memory 330. Processor 310 is operatively coupled to communications interface 320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300. Applications 333 can include, for example, an application module, a hypervisor, a virtual machine module, and/or an environment such as a runtime environment and/or virtual machine instance.

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Figure 2A:
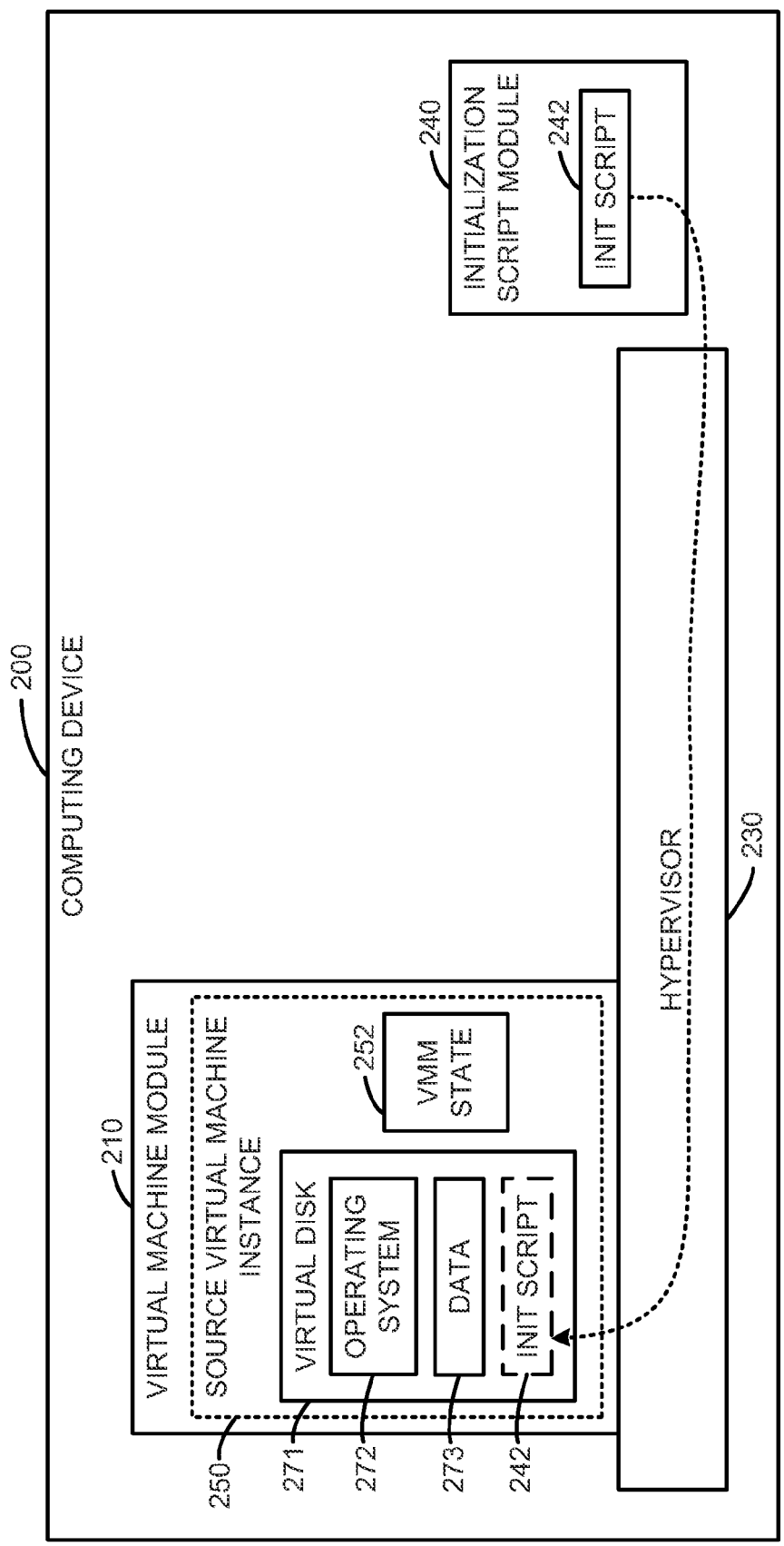
FIGS. 2A, 2B, 2C, and 2D are an illustration of a cloning a virtual machine instance at a computing device, according to an embodiment.

Referring to FIG. 2A, virtual machine module 210 (the source virtual machine module) includes source virtual machine instance 250. Source virtual machine instance 250 includes virtual disk 271 and virtual machine module state 252. Virtual disk 271 includes operating system 272, and data 273. In other words, operating system 272 is hosted at virtual machine module 210 as an element of source virtual machine instance 250. After a clone operation is requested (e.g., by a user or in response to an event such as a utilization value of source virtual machine instance 250 exceeding a threshold), an initialization script 242 (labeled "INIT SCRIPT") is generated at initialization script module 240. Initialization script module can be an application module hosted at computing device 200, at virtual machine module 210, or within hypervisor 230. Initialization script 242 can be generated based on input (or arguments or parameters) provided by a user or within a configuration file accessible to initialization script 242. For example, a user can specify a number of cloned virtual machine instances and virtual machine instance identifiers and IP addresses for those virtual machine instances. An initialization script can then be generated to output a particular IP address for each of the virtual machine instance identifiers received as an argument when the initialization script is executed.

In some embodiments, initialization script module 240 includes or can access an initialization script library (not shown) at a data store and select initialization script 242 from the initialization script library. Additionally, if initialization script 242 is selected from the initialization script library, initialization script 242 can be modified at initialization script module 240, for example, based on user input such as a number of cloned virtual machine instances to be generated from source virtual machine instance 210.

Initialization script 242 is then copied to virtual disk 271. Thus, initialization script 242 is included at virtual disk 271. In some embodiments, initialization script 242 can be scheduled to execute when operating system 272 is booted or initialized. In other words, initialization script 242 can be scheduled to be executed when a cloned virtual machine instance based on source virtual machine instance 250 is instantiated. For example, initialization script 242 can be stored within a directory of virtual disk 271 that is accessed to locate startup or login items for execution during a boot, loading, or initialization process of operating system 272. Alternatively, for example, an identifier of initialization script 242 (such as a path to initialization script 242 within a file system of virtual disk 271) can be stored in a list of startup items for operating system 272.

Figure 2B:
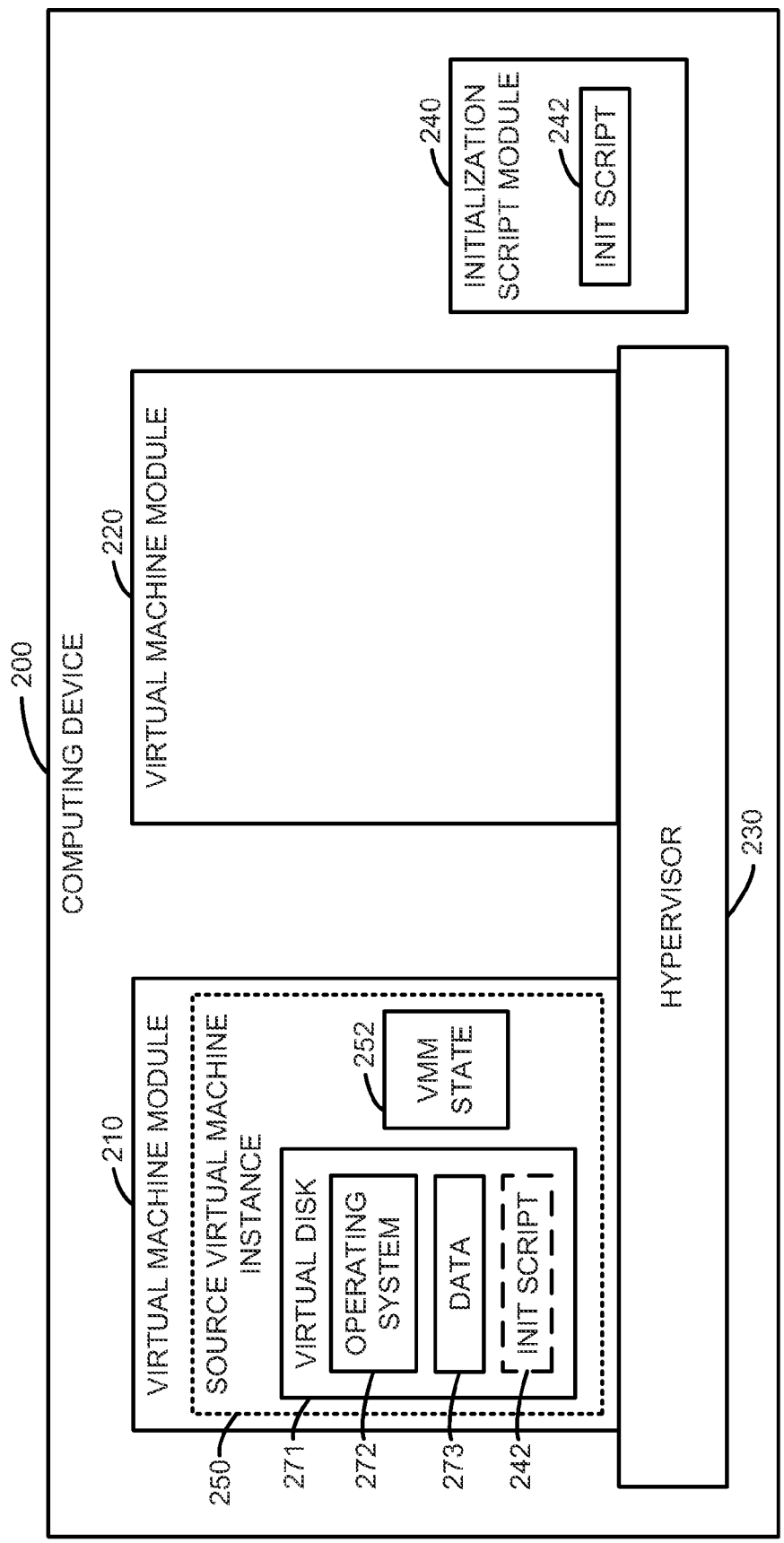
Figure 2C:
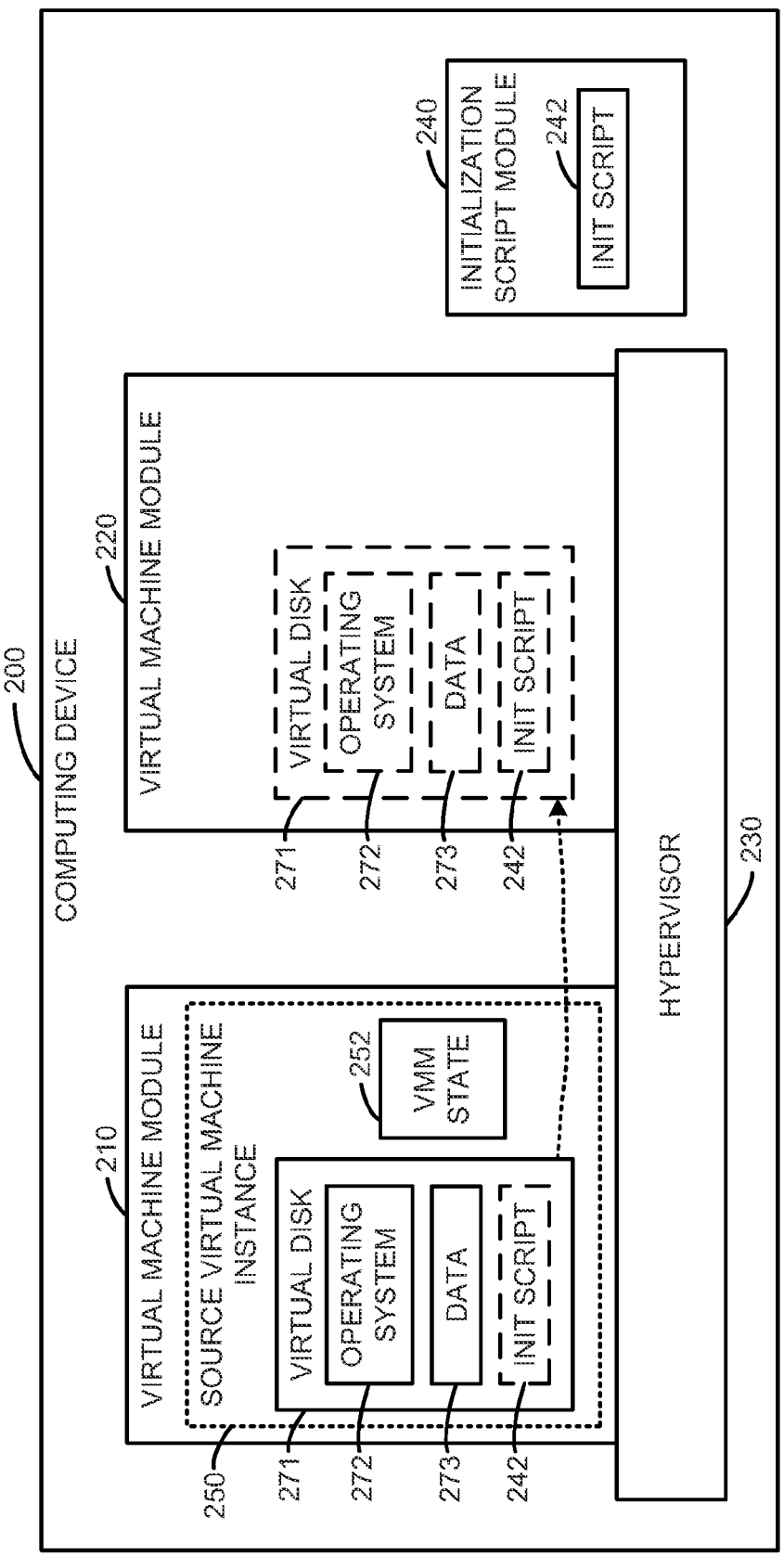

Referring to FIG. 2B, virtual machine module 220 is started or instantiated by hypervisor 230 to receive an image of virtual disk 271. As illustrated in FIG. 2C, an image of virtual disk 271 including operating system 272, data 273, and initialization script 242 is transferred to virtual machine module 220. The image of virtual disk 271 can be transferred to virtual machine module 220 via, for example, a shared memory interface of hypervisor 230 or an environment such as an operating system hosted at computing device 200, a system call interface or API of hypervisor 230 or an environment such as an operating system hosted at computing device 200, or one or more virtualized network interfaces of hypervisor 230 or an environment such as an operating system hosted at computing device 200.

Figure 2D:
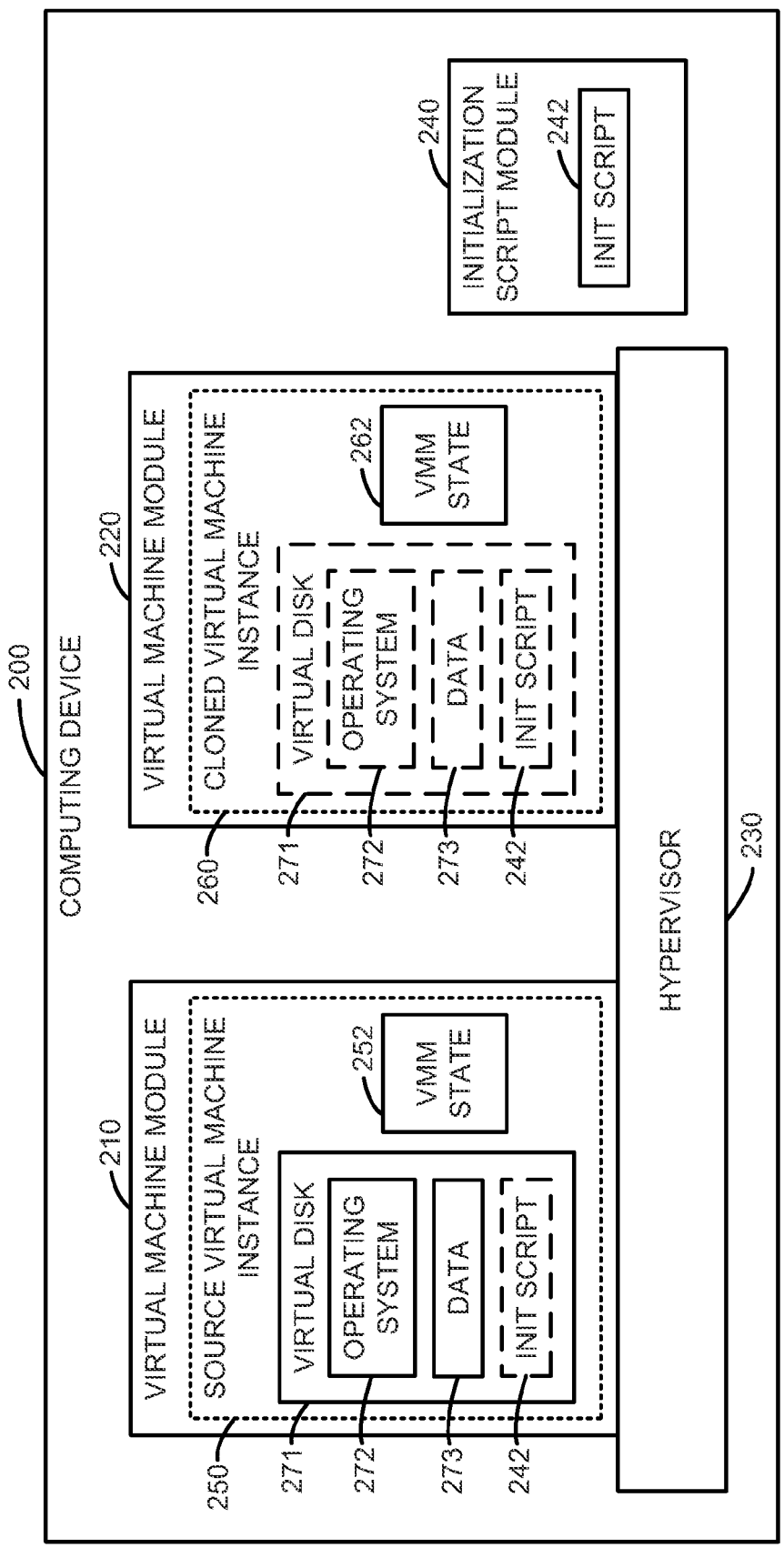

As illustrated in FIG. 2D, cloned virtual machine instance 260 is instantiated using the image of virtual disk 271. For example, operating system 272 can be booted from the image of virtual disk 271 and virtual machine module state 262 stores the current state information or context of virtual machine module 220. Initialization script 242 is then executed during instantiation of cloned virtual machine module 260 and runtime parameters defined by initialization script 242 are applied to cloned virtual machine instance 260 to differentiate cloned virtual machine instance 260 from source virtual machine instance 250, for example, as described above in relation to FIG. 1.

Figure 4:
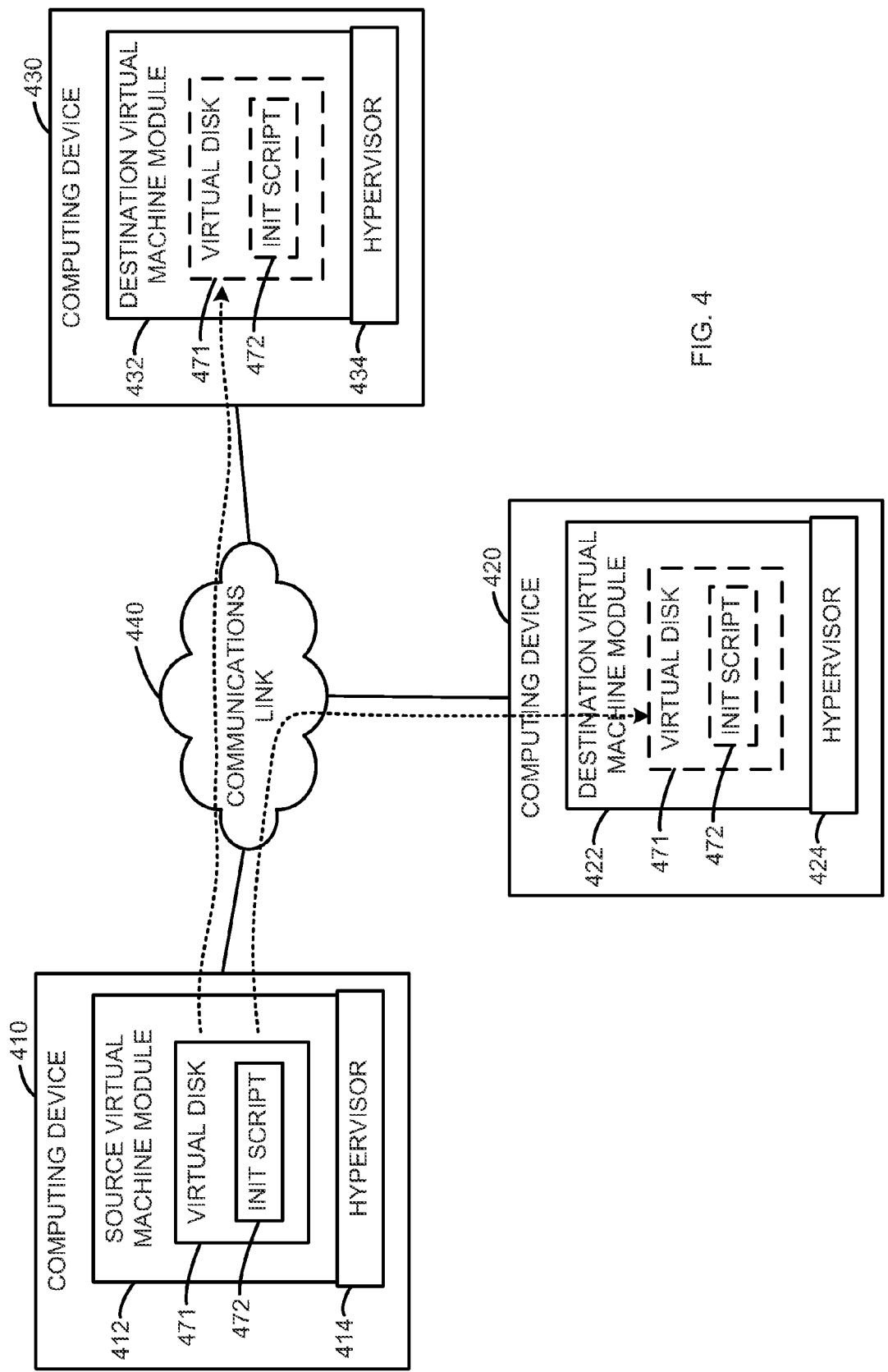
FIG. 4 is a schematic block diagram of a system for cloning an instance of a virtual machine including a group of computing devices with virtual machine modules, according to an embodiment.

Similarly, a virtual machine instance can be cloned from a computing device to other computing devices operatively coupled to the computing device. FIG. 4, for example, is a schematic block diagram of a system for cloning an instance of a virtual machine instance including a group of computing devices with virtual machine modules, according to an embodiment. As illustrated in FIG. 4, computing devices 410, 420 and 430 are operatively coupled via communications link 440. The system of FIG. 4 is illustrated logically rather than physically. In other words, the placement of and connections among the elements of the system (e.g., computing devices 410, 420 and 430 and communications link 440) represent logical relationships between the elements rather than their physical configuration. For example, computing devices 410 and 420 can be located at one physical location and computing device 430 can be located at another physical location. Said differently, the placement of and connections among the elements of the system illustrate communication of data symbols or data signals transmitted within the system.

Communications link 440 can include any connector and/or system that allow computing devices 410, 420 and 430 to communicate with one another. For example, communications link 440 can be one or more of a cable (e.g., telecommunication cable, twisted-pair cable, coaxial cable, or fiber-optic cable), wireless link or connection (e.g., radio-frequency link, wireless optical link, or infrared link), or any other connector or system that supports transmission of communications symbols. Additionally, communications link 440 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 440 can include multiple communications links and/or communications networks operatively coupled one to another by, for example, bridges, routers, switches, hubs, and/or gateways. For example, computing device 410 can be operatively coupled to a cellular network (not shown) and computing device 430 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional networks. For example, the cellular network and the fiber-optic network can each be operatively coupled to the Internet such that the cellular network, the fiber-optic network and the Internet are operatively coupled to form a communications link.

Computing device 410 includes (or hosts) hypervisor 414. Computing device 420 includes hypervisor 424. Computing device 430 includes hypervisor 434. Although not illustrated in FIG. 4, source virtual machine module 412 includes a source virtual machine instance including virtual disk 471, destination virtual machine module 422 includes a cloned virtual machine instance including an image of virtual disk 471, and destination virtual machine module 432 includes a cloned virtual machine instance including an image of virtual disk 471.

In response to a request to clone the source virtual machine instance hosted at source virtual machine module 412, initialization script 472 (labeled "INIT SCRIPT") is generated and stored at virtual disk 471 of the source virtual machine instance. In some embodiments, hypervisor 414 requests (not shown) at hypervisor 424 and at hypervisor 434 instantiation of destination virtual machine modules 422 and 432, respectively. Moreover, in some embodiments, hypervisor 414 sends (not shown) to hypervisor 424 and to hypervisor 434 parameters related to virtual disk 471 such as, for example, a number of cloned virtual machine instances to be instantiated and/or a range of virtual machine instance identifiers to be applied to the instantiated cloned virtual machine instances. Hypervisors 424 and 434 can instantiate one or more destination virtual machine modules such as destination virtual machine module 422 and destination virtual machine module 432, respectively, illustrated in FIG. 4.

An image of virtual disk 471 including initialization script 472 is then send via communications link 440 to destination virtual machine module 422 and destination virtual machine module 432. For example, the image of virtual disk 471 can be sent to computing devices 420 and 430 and stored at directories of those computing devices at which hypervisors 424 and 434, respectively, access virtual disks to instantiate virtual machine instances. Alternatively, for example, the image of virtual disk 471 can be sent to hypervisors 424 and 434 and hypervisors 424 and 434 can associated the image of virtual disk 471 with destination virtual machine module 422 and destination virtual machine module 432, respectively.

Cloned virtual machine instances are then instantiated at destination virtual machine module 422 and destination virtual machine module 432 based on the image of virtual disk 471 and those cloned virtual machine instances are differentiated from the source virtual machine instance as discussed above in relation to, for example, FIG. 1. In other words, initialization script 472 is provided one or more arguments (or input values) and executed at the cloned virtual machine instance at destination virtual machine module 422 and at the cloned virtual machine instance at destination virtual machine module 432, and the runtime parameters defined by initialization script 472 can be applied to those cloned virtual machine instances. Said differently, the cloned virtual machine instance at destination virtual machine module 422 and the cloned virtual machine instance at destination virtual machine module 432 can each be instantiated and/or initialized to include runtime parameters that differentiate the cloned virtual machine instances from the source virtual machine instance as discussed above.

Figure 5:
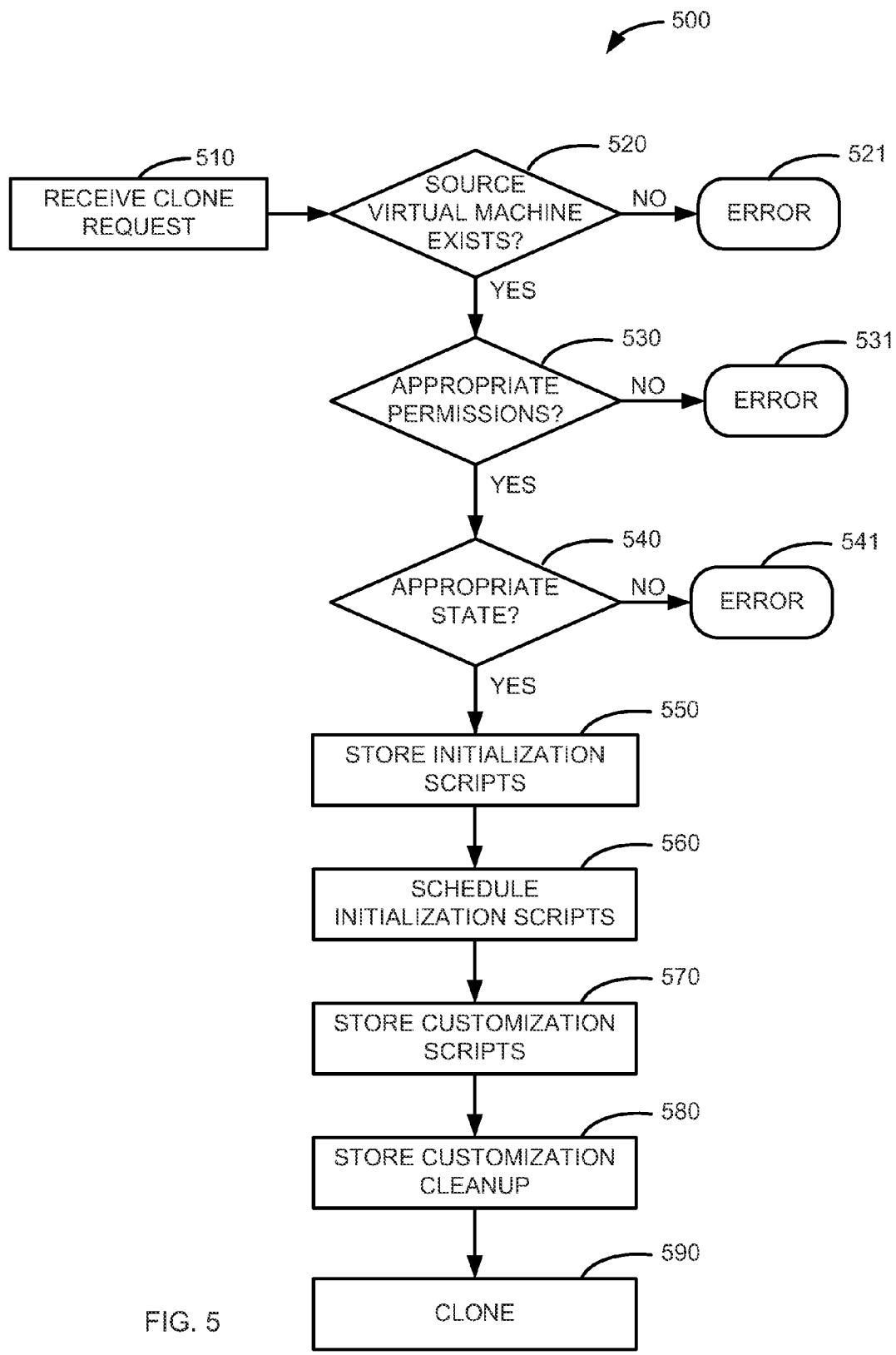
FIG. 5 is a flowchart of a process to clone a virtual machine instance, according to another embodiment.

In some embodiments, instantiation of cloned virtual machine instances is request by, for example, a hypervisor such as hypervisor 414. That is, hypervisor 414 can send a signal, command, instruction, or other request to hypervisor 424 and/or hypervisor 434 to request that cloned virtual machine instances be instantiated based on virtual disk 471. Alternatively, for example, a hypervisor or network administration tool can send such a request to a hypervisor in response to input from a user. In other embodiments, FIG. 5 is a flowchart of a process to clone a virtual machine instance, according to another embodiment. Process 500 can be implemented as a hardware module, as a software module, and/or as a combination of a hardware module and a software module. For example, process 500 can be implemented as application-specific circuitry or as a software module including instructions stored at a memory and executed at a processor in communication with the memory. More specifically, for example, process 500 can be implemented at a hypervisor or software module hosted at a computing device in communication with a hypervisor.

A request to clone a virtual machine instance (or a clone request) is received at block 510. The request can include, for example, an identifier of a source virtual machine instance, a number of cloned virtual machine instances to be cloned, one or more identifiers (such as network addresses or names) of computing devices at which the cloned virtual machines will be cloned, and/or a group or range of virtual machine instance identifiers to be associated with the cloned virtual machine instances.

If the source virtual machine instance exists (i.e., if a virtual machine instance having a source virtual machine instance identifier received at block 510 is accessible to a hypervisor) at block 520, permissions of the source virtual machine instance can be accessed at block 530. For example, permissions of the source virtual machine instance can be accessed at block 530 to determine whether a user providing the input values at block 510 is authorized to clone the source virtual machine instance based on, for example, an identifier and/or credential (e.g., a username and password or digital certificate) of that user received at block 510. In some embodiments, the cloning can be requested by, for example, a software application such as a performance monitoring tool and that software application can be the user that requested the cloning. Thus, permissions of that software application with respect to the source virtual machine module can be accessed at block 530.

Process 500 proceeds to block 540 to determine whether the source virtual machine module is in an appropriate state for cloning if the user is authorized (or allowed) to clone the source virtual machine instance. For example, a state such as whether the source virtual machine instance is operational, whether the source virtual machine instance is idle, and/or whether the source virtual machine instance is interruptible can be determined at block 540. If the source virtual machine instance is in an appropriate state for cloning (e.g., cloning can be effected when the source virtual machine instance is in its present state), process 500 can proceed to block 550.

If the source virtual machine instance does not exist at block 520, if the user is not authorized (or does not have adequate permissions) to clone the source virtual machine instance at block 530, and/or if the source virtual machine instance is not in an appropriate state for cloning at block 540, process 500 terminates in an error condition at blocks 521, 531, and/or 541, respectively. The error condition can be reported to the user as a failure, error, and/or exception notification. Alternatively, process 500 can include additional steps to attempt to rectify an error condition. For example, if the user is not authorized to clone the source virtual machine instance at block 530, additional or different credentials for the user can be requested. As an example, a different username and/or password (e.g., a username and password associated with an elevated privilege level of the user) can be requested and received. If the additional credentials provided by a user are sufficient, process 500 can proceed to block 540. Alternatively, if the source virtual machine instance is not in a state appropriate for cloning at block 540, process 500 can wait at block 540 until the source virtual machine instance is in an appropriate state for cloning or until a timeout period expires. For example, if the source virtual machine instance is not in an interruptible state at block 540, process 500 can wait at block 540 until the source virtual machine instance is in an interruptible state. Similarly, for example, if the source virtual machine instance is not powered on (i.e., is not operational at block 540), a hypervisor can attempt to power on the source virtual machine instance at block 540. If the hypervisor successfully powers on the source virtual machine instance, process 500 can proceed to block 550.

An initialization script is stored at a virtual disk of the source virtual machine instance at block 550. As discussed above, the initialization script can be generated dynamically in response to a request for cloning received, for example, at block 510 and/or can be accessed from a' library of initialization scripts. In some embodiments, multiple initialization scripts are stored at the virtual disk at block 550. For example, a group of initialization scripts that are executed at different times during a boot or initialization process of an operating system within a cloned virtual machine instance can be stored at the virtual disk. Initialization scripts can also be defined using various programming languages, scripting languages, and/or APIs. Furthermore, initialization scripts can be specific or generic. For example, an initialization script can access an API of an operating system and, therefore, be specific to that operating system. Alternatively, an initialization script can be implemented using a language that can be interpreted in multiple environments (e.g., within multiple operating systems) such as Java®, Python®, and/or Perl® and be operating system agnostic. Additionally, initialization scripts can be specific to a particular computing device or architecture of a computing device, to a particular hypervisor (or class of hypervisor) or virtual machine module (or class of virtual machine module), or to a particular version or revision of a software module such as a firmware version. In other words, initialization scripts can include instructions or operations that are specific to a particular computing device, software module, hypervisor, and/or virtual machine module and/or that are generic or applicable to various computing devices, software modules, hypervisors, and/or virtual machine modules.

The initialization scripts can then be scheduled for execution at block 560. For example, the initialization scripts can be scheduled by storing the initialization scripts in specific directories within the file system of the virtual disk of the source virtual machine instance. As a specific example, the initialization scripts can be scheduled for execution at specific stages of initialization of a Linux®-based operating system by storing the initialization scripts in directories of the /etc/rc.d/ directory structure that are associated with each stage of initialization. As another example, a path of each initialization script can be stored within one or more startup items entries in the registry of a Microsoft Windows® operating system at the virtual disk of the source virtual machine instance. In other words, the initialization scripts (or references to the initialization scripts) can be stored at the virtual disk of the source virtual machine instance such that the initialization scripts will be executed in a particular order during initialization (or booting) of an operating system also stored at that virtual disk (or during specific stages of initialization of that operating system).

Alternatively, the initialization script can be executed at a time other than at initialization of the cloned virtual machine instance. For example, an initialization (or other) script can be scheduled to be executed or processed in response to an event such as expiry of a timer, at a predetermined time, or in response to data or a signal received at a communications interface associated with the cloned virtual machine instance such as a network interface. As a specific example, the initialization script can be executed when a user first logs into the cloned virtual machine instance or when a particular software module (i.e., software application program) is started or instantiated at the cloned virtual machine instance.

In addition to the initialization scripts, customization scripts can be stored at the virtual disk of the source virtual machine instance at block 570. Customization scripts include instructions that are executed after initialization scripts are executed at a cloned virtual machine instance (i.e., after the runtime parameters generated by the initialization scripts have been applied to the cloned virtual machine instance). Customization scripts apply customizations such as, for example, downloading and installing software applications at the cloned virtual machine instance; generating public/private key pairs or digital certificates at the cloned virtual machine instance; setting environment variables at the cloned virtual machine instance; defining hierarchical relationships (e.g., client and server relationships) between the cloned virtual machine instance and other virtual machine instances and/or computing devices; and/or other customizations.

Additionally, cleanup scripts can be stored at the virtual disk of the source virtual machine instance at block 580. Cleanup scripts include instructions to remove (i.e., delete), disable, and/or move (i.e., store in a different location) initialization scripts and/or customization scripts. Thus, cleanup scripts are typically scheduled for execution after execution of initialization scripts and customization scripts.

Customization scripts and cleanup scripts can be scheduled, for example, as discussed above in relation to block 560. In other words, initialization scripts, customization scripts, and cleanup scripts can be scheduled using a common methodology or mechanism. Alternatively, for example, customization scripts and cleanup scripts can be scheduled within initialization scripts. As a specific example, the initialization script that is scheduled to be executed last in a group of initialization scripts can include an instruction (or instructions) to initiate execution of one or more customization scripts. In some embodiments, the customization scripts and cleanup scripts can be chained together such that execution of the first customization script is initiated by instructions within the last initialization script to be executed, execution of the second customization script is initiated by instructions within the first customization script, execution of the first cleanup script is initiated by instructions within the last customization script to be executed, and execution of the second cleanup script is initiated by instructions within the first cleanup script. Thus, initialization scripts, customization scripts, and cleanup scripts can be executed in a particular order or sequence within a cloned virtual machine module.

After the initialization scripts, customization scripts, and cleanup scripts are stored at the virtual disk of the source virtual machine instance, the source virtual machine instance can be cloned to one or more virtual machine modules at block 590. Cloning the source virtual machine instance to one or more virtual machine modules is discussed in more detail herein, for example, in relation to FIG. 6.

Process 500 can include blocks in addition to those illustrated in FIG. 5. Additionally, one or more blocks can be rearranged. Furthermore, although process 500 is discussed above with reference to an example environment including a hypervisor, process 500 is applicable within other environments.

Figure 6:
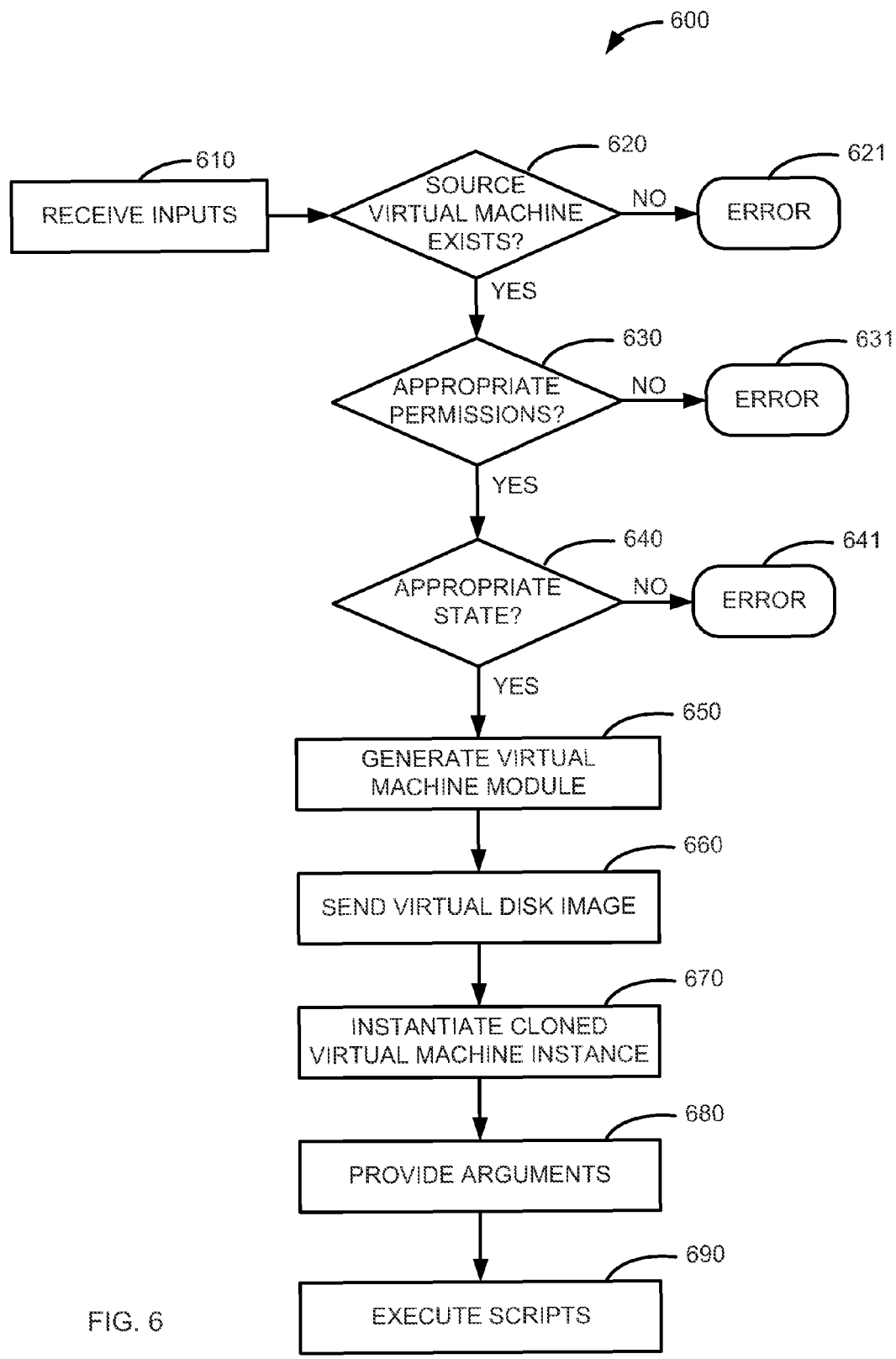
FIG. 6 is a flowchart of a process to clone a virtual machine instance, according to another embodiment.

FIG. 6 is a flowchart of a process to clone a virtual machine instance, according to another embodiment. Process 600 can be implemented as a hardware module, as a software module, and/or as a combination of a hardware module and a software module. For example, process 600 can be implemented as application-specific circuitry or as a software module including instructions stored at a memory and executed at a processor in communication with the memory. More specifically, for example, process 600 can be implemented at a hypervisor.

Input parameters related to cloning a source virtual machine instance are received at block 610 at block 610. The input parameters are received from a user, another hypervisor, or a software module hosted at a computing device. The input parameters can include, for example, a description of a hardware configuration of a source virtual machine module, an identifier of a source virtual machine instance, a number of cloned virtual machine instances to be cloned, and/or a group or range of virtual machine instance identifiers to be associated with the cloned virtual machine instances.

If the source virtual machine instance exists (i.e., if a virtual machine instance having a source virtual machine instance identifier received at block 610 is accessible to a hypervisor) at block 620, permissions of the source virtual machine instance can be accessed at block 630. For example, permissions of the source virtual machine instance can be accessed at block 630 to determine whether a user providing the input values at block 610 is authorized to clone the source virtual machine instance based on, for example, an identifier and/or credential (e.g., a username and password or digital certificate) of that user received at block 610. In some embodiments, the cloning can be requested by, for example, a software application such as a hypervisor and that software application can be the user that requested the cloning. Thus, permissions of that software application with respect to the source virtual machine module can be accessed at block 630.

Process 600 proceeds to block 640 to determine whether the source virtual machine module is in an appropriate state for cloning if the user is authorized (or allowed) to clone the source virtual machine instance. For example, a state such as whether the source virtual machine instance is operational, whether the source virtual machine instance is idle, and/or whether the source virtual machine instance is interruptible can be determined at block 640. If the source virtual machine instance is in an appropriate state for cloning, process 600 can proceed to block 650.

If the source virtual machine instance does not exist at block 620, if the user is not authorized (or does not have adequate permissions) to clone the source virtual machine instance at block 630, and/or if the source virtual machine instance is not in an appropriate state for cloning at block 640, process 600 terminates in an error condition at blocks 621, 631, and/or 640, respectively. The error condition can be reported to the user as a failure, error, and/or exception notification. Alternatively, process 600 can include additional steps to attempt to rectify an error condition. For example, if the user is not authorized to clone the source virtual machine instance at block 630, additional or different credentials for the user can be requested. As an example, a different username and/or password (e.g., a username and password associated with an elevated privilege level of the user) can be requested and received. If the additional credentials provided by a user are sufficient, process 600 can proceed to block 640. Alternatively, if the source virtual machine instance is not in a state appropriate for cloning at block 640, process 600 can wait at block 640 until the source virtual machine instance is in an appropriate state for cloning or until a timeout period expires. For example, if the source virtual machine instance is not in an interruptible state at block 640, process 600 can wait at block 640 until the source virtual machine instance is in an interruptible state. Similarly, for example, if the source virtual machine instance is not powered on (i.e., is not operational at block 640), a hypervisor can attempt to power on the source virtual machine instance at block 640. If the hypervisor successfully powers on the source virtual machine instance, process 600 can proceed to block 650.

A destination virtual machine module is generated (or instantiated) at block 650. For example, a destination virtual machine module is generated at block 650 based on a description of the hardware configuration of the source virtual machine module received at block 610. The description of a hardware configuration of a source virtual machine module can describe the virtualized and/or physical components that were (or are) available to the source virtual machine instance at the source virtual machine module via a hypervisor associated with the source virtual machine module. In other words, a destination virtual machine module that provides a virtual machine instance with access to the same types of components (or resources) that are provided to the source virtual machine instance via the source virtual machine module can be instantiated based on the description of the hardware configuration of the source virtual machine module received at block 610. Said yet another way, the architecture of the source virtual machine module can be replicated at the destination virtual machine module based on the description of the hardware configuration of the source virtual machine module.

After the virtual machine module is instantiated, an image of the virtual disk of the source virtual machine instance including initialization scripts, customization scripts, and/or cleanup scripts can be generated and sent to the destination virtual machine module at block 660. For example, the image of the virtual disk of the source virtual machine instance can be sent to the destination virtual machine module via a shared memory interface of a hypervisor or an environment such as an operating system, a system call interface or API of a hypervisor or an environment such as an operating system, or one or more virtualized network interfaces of a hypervisor or an environment such as an operating system.

The image of the virtual disk of the source virtual machine instance is accessed at block 670 to instantiate a cloned virtual machine instance from the image of the virtual disk. As discussed above, for example, the cloned virtual machine instance can be instantiated by booting an operating system stored at the image of the virtual disk. During the instantiation of the cloned virtual machine instance, arguments such as a virtual machine instance identifier can be provided to or accessed by the cloned virtual machine instance at block 680. For example, a hypervisor can set a MAC address of a virtualized network interface to a value of a virtual machine instance identifier received at block 610, and the cloned virtual machine instance can access that MAC address. In other words, a hypervisor can define an identifier of a virtualized component provided to a destination virtual machine module to have a value of a virtual machine instance identifier received as an input parameter to process 600.

The arguments (e.g., a virtual machine instance identifier) received at block 680 are provided to the initialization scripts, customization scripts, and/or cleanup scripts stored at the image of the virtual disk and scheduled to execute in an order or sequence defined by the scheduling (discussed above) of those initialization scripts, customization scripts, and/or cleanup scripts within the cloned virtual machine module at block 690. The execution of initialization scripts, customization scripts, and/or cleanup scripts is discussed in more detail herein for example, in relation to FIG. 7.

Process 600 can include blocks in addition to those illustrated in FIG. 6. Additionally, one or more blocks can be rearranged. Furthermore, although process 600 is discussed above with reference to an example environment including a hypervisor, process 600 is applicable within other environments.

Figure 7:
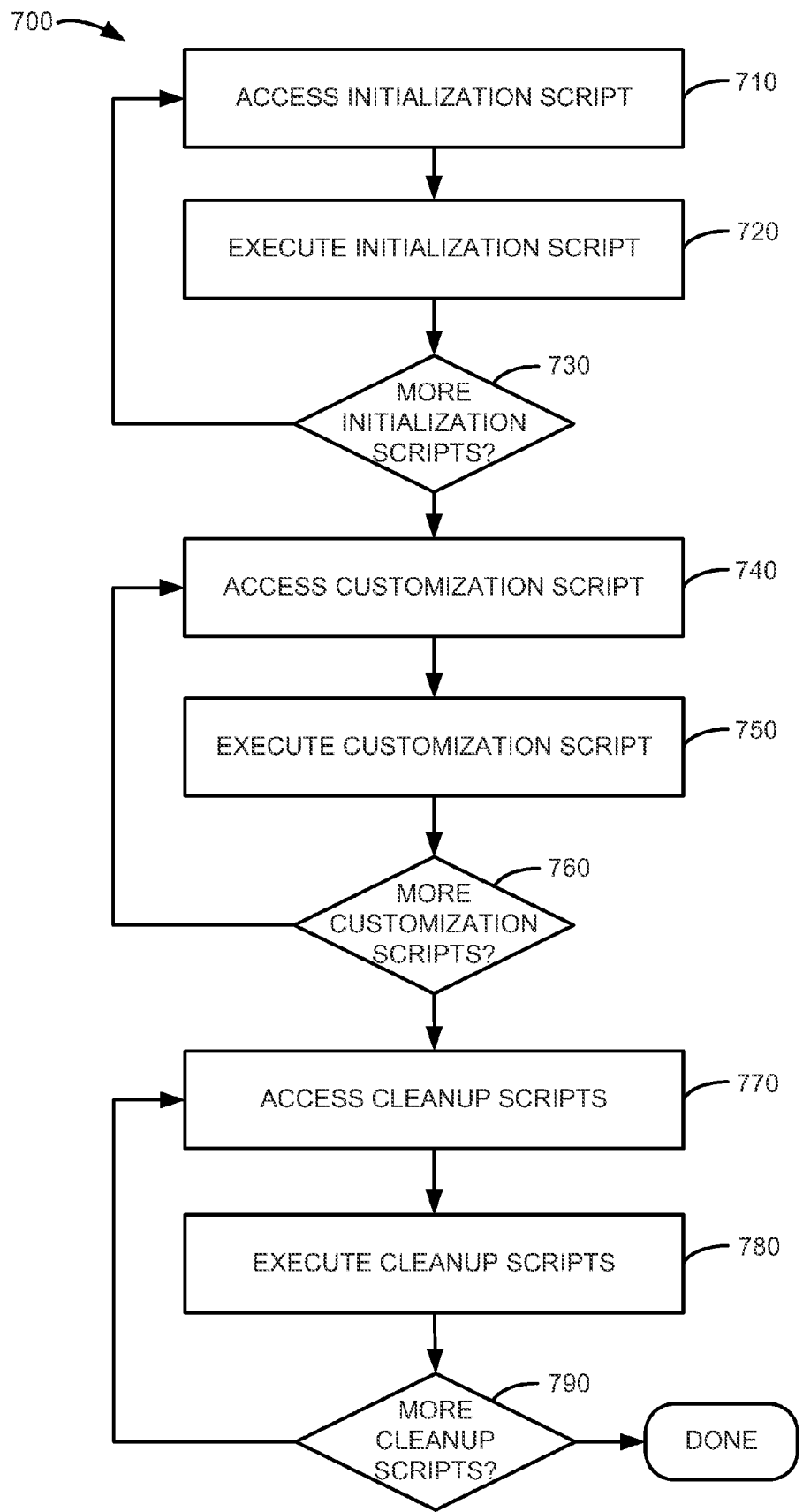
FIG. 7 is a flowchart of a process to customize a cloned virtual machine instance, according to an embodiment.

FIG. 7 is a flowchart of a process to customize a cloned virtual machine instance, according to an embodiment. Process 700 can be implemented as a hardware module, as a software module, and/or as a combination of a hardware module and a software module. For example, process 700 can be implemented as application-specific circuitry or as a software module including instructions stored at a memory and executed at a processor in communication with the memory. More specifically, for example, process 700 can be implemented at a cloned virtual machine instance hosted at a virtual machine module at a hypervisor.

An initialization script is accessed at block 710 and executed at block 720. For example, the initialization script from a group of initialization scripts that is scheduled for execution first can be selected at block 710. As a more specific example, the initialization script that is scheduled by an rc script architecture for execution first during booting of a Linux®-based operating system within a cloned virtual machine instance can be selected at block 710. As another example, the initialization script scheduled that is scheduled for execution as a task before other initialization scripts in a Microsoft Windows® operating system can be selected at block 710. Said differently, initialization scripts are selected at block 710 in an order defined by the scheduling of those initialization scripts.

The selected initialization script is then executed at the cloned virtual machine instance at block 720 to initialize the cloned virtual machine instance to be different from the source virtual machine instance. In other words, the instructions of the initialization script selected at block 710 are executed (or interpreted) within the cloned virtual machine instance to define runtime parameters of the cloned virtual machine instance and to apply those runtime parameters to the cloned virtual machine instance. As discussed above, in some embodiments, a virtual machine instance identifier can be provided (or accessible) to the initialization script and the runtime parameters generated can be based at least in part on the virtual machine instance identifier. As a specific example, a MAC address of a virtualized network interface can be a virtual machine instance identifier and can be provided to an initialization script as an environment variable of an execution environment of the initialization script. Alternatively, for example, the initialization script can invoke an API of the execution environment to access the MAC address. An IPv4 address different from an IPv4 address of the source virtual machine instance can be defined by the initialization script based on the MAC address, and that IPv4 address can be assigned to the cloned virtual machine instance (or the virtualized network interface of the cloned virtual machine instance) as, for example, a static IP address of the virtualized network interface of that cloned virtual machine instance.

If there are more initialization scripts scheduled for execution at block 730, process 700 returns to block 710 and the initialization script scheduled to be executed next is selected. Thus, as illustrated in FIG. 7, blocks 710, 720, and 730 are repeated until each initialization script from a group of initialization scripts is executed. If there are no more initialization scripts scheduled for execution at block 730, process 700 proceeds to block 740.

A customization script is accessed at block 740 and executed at block 750. For example, the customization script from a group of customization scripts that is scheduled for execution first can be selected at block 740. As discussed above and similar to initialization scripts, customization scripts can be scheduled for executed and executed according to the schedule (or the order defined by the scheduling) using various methodologies. For example, the rc script architecture of a Linux®-based operating system or a task architecture of a Microsoft Windows® operating system can be used to schedule and/or execute customization scripts. Said differently, the customization scripts can be selected and executed in the order defined by the scheduling of those customization scripts.

If there are more customization scripts scheduled for execution at block 760, process 700 returns to block 740 and the customization script scheduled to be executed next is selected. Thus, as illustrated in FIG. 7, blocks 740, 750, and 760 are repeated until each customization script from a group of customization scripts is executed. If there are no more customization scripts scheduled for execution at block 760, process 700 proceeds to block 770.

A cleanup script is accessed at block 770 and executed at block 780. For example, the cleanup script from a group of cleanup scripts that is scheduled for execution first can be selected at block 770. As discussed above and similar to initialization scripts and customization scripts, cleanup scripts can be scheduled for executed and executed according to the schedule (or the order defined by the scheduling) using various methodologies. For example, the rc script architecture of a Linux®-based operating system or a task architecture of a Microsoft Windows® operating system can be used to schedule and/or execute cleanup scripts. Said differently, the cleanup scripts can be selected and executed in the order defined by the scheduling of those cleanup scripts.

If there are more cleanup scripts scheduled for execution at block 790, process 700 returns to block 770 and the cleanup script scheduled to be executed next is selected. Thus, as illustrated in FIG. 7, blocks 770, 780, and 790 are repeated until each cleanup script from a group of cleanup scripts is executed. If there are no more cleanup scripts scheduled for execution at block 790, process 700 terminates.

Process 700 can include blocks in addition to those illustrated in FIG. 7. Additionally, one or more blocks can be rearranged. For example, FIG. 7 illustrates a methodology of processing initialization scripts, customization scripts, and/or cleanup scripts in which initialization scripts are executed before customization scripts, customization scripts are executed before cleanup scripts, and cleanup scripts are executed after all initialization scripts and customization scripts are executed. In other embodiments, initialization scripts, customization scripts, and/or cleanup scripts can be scheduled to have a different order. For example, an initialization script can be associated with a customization script and/or a cleanup script that is executed (e.g., scheduled for execution) after that initialization script and before a different initialization script. In other words, execution of initialization scripts, customization scripts, and/or cleanup scripts can be interleaved with the execution of other initialization scripts, customization scripts, and/or cleanup scripts. Furthermore, although process 700 is discussed above with reference to an example environment including a hypervisor, process 700 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 8:
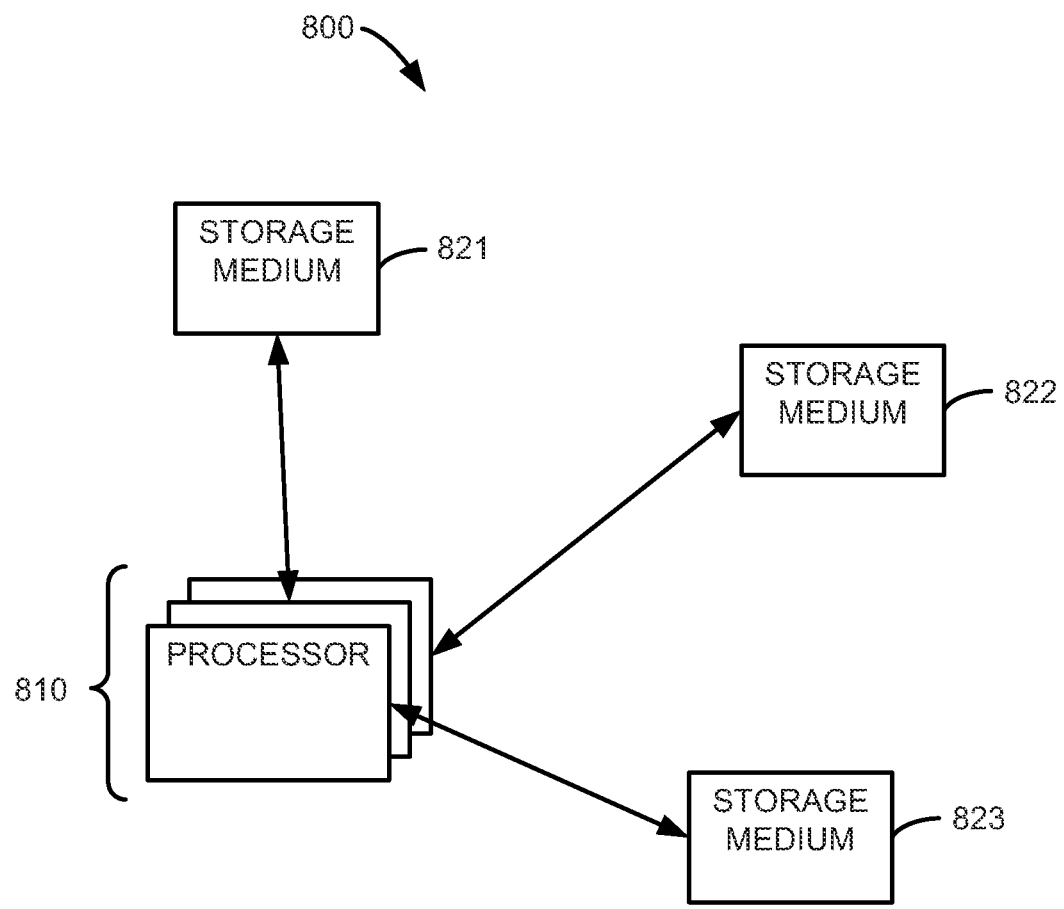
FIG. 8 is a schematic block diagram of a system including a processor and storage media, according to an embodiment.

As an example of a system including one or more processors and processor-readable storage media, FIG. 8 is a schematic block diagram of system 800 including a processor and storage media, according to an embodiment. As illustrated in FIG. 8, system 800 includes one or more processors 810 operatively coupled to storage medium 821, storage medium 822, and storage medium 823. One or more processors 810 can access instructions or code at storage medium 821, storage medium 822, and storage medium 823. Storage media 821, 822, and 823 can be any processor-readable media and/or related devices to access processor-readable media. For example, storage medium 821 can be a hard disk drive including a magnetic storage medium, storage medium 822 can be an optical drive such as a DVD drive and can accept DVD storage media on which processor-readable instructions can be stored, and storage medium 823 can be a FLASH memory drive with a Universal Serial Bus ("USB") interface. In some embodiments, storage media 821, 822, and/or 823 can be local to (e.g., coupled to a common computing device) one or more processors 810. In some embodiments, storage media 821, 822, and/or 823 can be remote from (e.g., coupled to a separate computing device) one or more processors 810 and in communication with one or more processors 810 via communications link. Furthermore, one or more of storage media 821, 822, and/or 823 can be local to one or more processors 810 and one or more of the remaining of storage media 821, 822, and/or 823 can be remote from one or more processors 810.

As a more specific example, one or more processors 810 can be included within a computing device such as a communications device having an internal solid-state data store represented by storage medium 821 and a removable solid-state data store such as a Secure Digital High-Capacity ("SDHC") memory card represented by storage medium 822. The computing device can also include a USB host controller to communicate with a USB FLASH memory drive represented by storage medium 823. One or more processors 810 can access processor-readable instructions such as processor-readable instructions that implement an operating system, software application, and/or one or more processes at any of storage media 821, 822, and/or 823. Said differently, one or more processors 810 can interpret or execute instructions at processor-readable media via storage medium 821, storage medium 822, and/or storage medium 823. In some embodiments, system 800 can include one or more memories such as RAM that function as a cache between one or more of storage medium 821, storage medium 822, and/or storage medium 823 and one or more processors 810 for instructions or code stored (or accessible) at one or more of storage medium 821, storage medium 822, and/or storage medium 823.

While certain embodiments have been shown and described above, various changes in form and details may be made. For example, some features of embodiments that have been described in relation to one embodiment and/or process can be related to other embodiments. In other words, processes, features, and/or properties of various embodiments described in relation to one embodiment can be useful in other embodiments. Furthermore, it should be understood that the systems and methods described herein can include various combinations and/or sub-combinations of the components and/or features of the different embodiments described. As a specific example, embodiments discussed in relation to cloning a source virtual machine can be applicable to migration of virtual machines. That is, a source virtual machine instance can be copied to another virtual machine module as described in various embodiment discussed above and the source virtual machine instance can then be powered down or halted such that the copied (or migrated) virtual machine instance is active (or running) and the source virtual machine module is halted. Thus, features described with reference to one or more embodiments can be combined with other embodiments described herein.

What is claimed is:

1. A method of cloning a source virtual machine instance, comprising:
accessing an initialization script including instructions to define a value of a parameter at a cloned virtual machine instance, the value of the parameter at the cloned virtual machine instance being different from a value of the parameter at the source virtual machine instance;
storing the initialization script at a virtual disk of the source virtual machine instance; and
sending an image of the virtual disk to a virtual machine module.

2. The method of claim 1, further comprising:
executing the initialization script at the cloned virtual machine instance in response to instantiation of the cloned virtual machine instance at the virtual machine module; and
defining the value of the parameter at the cloned virtual machine instance during the executing.

3. The method of claim 1, wherein the virtual machine module is in communication with a hypervisor, the method further comprising:
requesting instantiation of the cloned virtual machine instance at the virtual machine module based on the image of the virtual disk, the initialization script executed independent of the hypervisor within the cloned virtual machine instance in response to the instantiation of the cloned virtual machine instance.

4. The method of claim 1, further comprising:
generating, before the sending, the virtual machine module; and
providing an identifier of the virtual machine module to the initialization script.

5. The method of claim 1, further comprising:
defining a customization script including instructions to customize the cloned virtual machine instance;
storing the customization script at the virtual disk; and
scheduling the initialization script to execute before the customization script during initialization of the cloned virtual machine instance.

6. The method of claim 1, wherein:
the virtual machine module is a destination virtual machine module in communication with a hypervisor of a first hypervisor class; and
the source virtual machine instance is at a source virtual machine module in communication with a hypervisor of a second hypervisor class, the second hypervisor class being different from the first hypervisor class.

7. The method of claim 1, further comprising:
receiving a clone request to prepare the source virtual machine instance for cloning before the accessing, the accessing being in response to the clone request.

8. The method of claim 1, further comprising:
generating the initialization script before the accessing; and
requesting instantiation of the cloned virtual machine instance at the virtual machine module based on the image of the virtual disk in response to the clone request.

9. A method of cloning a source virtual machine instance, comprising:
storing an initialization script at a virtual disk of the source virtual machine instance;
sending an image of the virtual disk to a first virtual machine module and a second virtual machine module;
providing a first virtual machine identifier to a first cloned virtual machine instance at the first virtual machine module;
defining a value of a parameter at the first cloned virtual machine instance based on the initialization script and the first virtual machine identifier;
providing a second virtual machine identifier to a second cloned virtual machine instance at the second virtual machine module; and
defining a value of the parameter at the second cloned virtual machine instance based on the initialization script and the second virtual machine identifier, the value of the parameter at the second cloned virtual machine instance different from the value of the parameter at the first cloned virtual machine instance.

10. The method of claim 9, wherein the parameter of the first cloned virtual machine instance is different from the parameter of the second cloned virtual machine instance.

11. The method of claim 9, wherein:
the parameter of the first cloned virtual machine instance is a first cryptographic key; and
the parameter of the second cloned virtual machine instance is a second cryptographic key.

12. The method of claim 9, wherein:
the parameter of the first cloned virtual machine instance is a communications network address of the first cloned virtual machine instance; and
the parameter of the second cloned virtual machine instance is a communications network address of the second cloned virtual machine instance.

13. The method of claim 9, wherein:
the parameter of the first cloned virtual machine instance is a static Internet Protocol address of the first cloned virtual machine instance; and
the parameter of the second cloned virtual machine instance is a static Internet Protocol address of the second cloned virtual machine instance different from the static Internet Protocol address of the first cloned virtual machine instance.

14. The method of claim 9, further comprising:
receiving a clone request; and
generating the initialization script in response to the clone request.

15. The method of claim 9, wherein:
the first virtual machine module is compatible with a first hypervisor class; and
the second virtual machine module is compatible with a second hypervisor class, the second hypervisor class being different from the first hypervisor class.

16. A non-transitory processor-readable medium storing code representing instructions to cause a processor to perform a process, the process comprising:
receiving a clone request;
storing, in response to the clone request, an initialization script including instructions to differentiate a cloned virtual machine instance from a source virtual machine instance at a virtual disk of the source virtual machine instance;

sending an image of the virtual disk to a virtual machine module, the image of the virtual disk including the initialization script; and requesting instantiation of the cloned virtual machine instance based on the image of the virtual disk image at the virtual machine module.

17. The processor-readable medium of claim 16, the process further comprising:

generating the initialization script in response to the clone request.

18. The processor-readable medium of claim 16, wherein the initialization script is a first initialization script, the processor further comprising:

storing a second initialization script including instructions to customize the cloned virtual machine instance at the virtual disk of the source virtual machine instance; and scheduling the second initialization script for execution at the cloned virtual machine instance after the first initialization script.

19. The processor-readable medium of claim 16, wherein the instructions of the initialization script include instructions to differentiate the cloned virtual machine instance from the source virtual machine instance by defining a cryptographic key for the cloned virtual machine instance, the cryptographic key for the cloned virtual machine instance different from a cryptographic key of the source virtual machine instance.

20. The processor-readable medium of claim 16, wherein:

the instructions of the initialization script include instructions to differentiate the cloned virtual machine instance from the source virtual machine instance by defining a communications network address for the cloned virtual machine instance, the communications network address for the cloned virtual machine instance different from a communications network address of the source virtual machine instance.

* * * * *